(12) United States Patent
Lee et al.

(10) Patent No.: US 8,291,391 B2
(45) Date of Patent: Oct. 16, 2012

(54) JAVA BYTECODE TRANSLATING METHOD

(75) Inventors: Jong Sung Lee, Seoul (KR); Hyeong Cheol Oh, Seoul (KR); Hyun Gyu Kim, Yongin (KR); Kwan Young Kim, Sungnam (KR)

(73) Assignee: Advanced Digital Chips Inc., Seoul (KR)

( * ) Notice: Subject to any disclaimer, the term of this patent is extended or adjusted under 35 U.S.C. 154(b) by 828 days.

(21) Appl. No.: 12/514,430

(22) PCT Filed: Aug. 19, 2008

(86) PCT No.: PCT/KR2008/004796
§ 371 (c)(1),
(2), (4) Date: May 11, 2009

(87) PCT Pub. No.: WO2009/051335
PCT Pub. Date: Apr. 23, 2009

(65) Prior Publication Data
US 2010/0064276 A1    Mar. 11, 2010

(30) Foreign Application Priority Data

Oct. 17, 2007  (KR) .................. 10-2007-0104479

(51) Int. Cl.
*G06F 9/44* (2006.01)
*G06F 9/45* (2006.01)
(52) U.S. Cl. ...................... 717/136; 717/118
(58) Field of Classification Search .......... 717/118, 717/136
See application file for complete search history.

(56) References Cited

U.S. PATENT DOCUMENTS

| | | | |
|---|---|---|---|
| 5,875,336 A * | 2/1999 | Dickol et al. | 717/143 |
| 7,263,722 B1 | 8/2007 | Luo et al. | |
| 7,613,903 B2 * | 11/2009 | Yoshida | 712/209 |
| 2003/0192037 A1 | 10/2003 | Yoon | |
| 2005/0160415 A1 | 7/2005 | Kwon et al. | |
| 2006/0070049 A1 * | 3/2006 | Chung | 717/148 |
| 2006/0253847 A1 * | 11/2006 | Romanovskiy | 717/153 |
| 2007/0118724 A1 | 5/2007 | Patel | |

OTHER PUBLICATIONS

Michael Weiss et al., "TurboJ, a Java bytecode-to-native compiler", 1998, Languages, Compilers and Tools for Embedded Systems, vol. 1474/1998, pp. 119-130.*
James Gosling, "Java Intermediate Bytecodes", 1995, IR '95 Papers from the 1995 ACM SIGPLAN workshop on Intermediate representations.*

(Continued)

*Primary Examiner* — Wei Zhen
*Assistant Examiner* — Lanny Ung
(74) *Attorney, Agent, or Firm* — IPLA P.A.; James E. Bame (57) ABSTRACT

Provided is a Java bytecode translating method which includes: a bytecode fetch step (S1 10) that fetches a Java bytecode from a Java class file; a static field address detection and data processing step (S140) which gains access to a field (130) according to a first field address (FA1) and processes data; a static field address storage step (S 150) that stores a first upper field address (FAU1) including upper bits among bits of the first field address (FA1) in a first storage portion (110), and which stores a first lower field address (FAD1) including remainder lower bits excluding the first upper field address (FAU1) among the bits of the first field address (FA1) in an operand field (120*b*); a static operation code translating step (S 160) that translates an operation code stored in an operation code field (120*a*) into a new static field accessing operation code (NOPA); a first field address creation step (S240) that creates a second field address (FA2); and a first data processing step (S250) that gains access to the field (130) according to a second field address (F A2) and processes data.

10 Claims, 9 Drawing Sheets

OTHER PUBLICATIONS

Cinzia Bernardeschi et al., "Combining Abstract Interpretation and Model Checking for Analysing Security Properties of Java Bytecode", 2002, Verification, Model Checking and Abstract Interpretation, vol. 2294/2002, pp. 233-236.*

* cited by examiner

JAVA BYTECODE TRANSLATING METHOD

TECHNICAL FIELD

The present invention relates to a Java bytecode translating method, and more particularly to a Java bytecode translating method that can improve performance of a Java virtual machine, in which a field access bytecode is translated without having a progress of an analysis process of a constant pool when performing the field access bytecode among Java bytecodes, to thereby remarkably reduce the number of native codes.

BACKGROUND ART

In general, Java language is compiled into intermediate language which is called as Java Virtual Machine Language (JVML) which can be interpreted by a Java Virtual Machine. The compiled result is called as a class file. The class file includes bytecodes.

Because the Java virtual machine bases on an stack operation, all operands are stored in a stack before they are used, and the operation result is also stored in the stack. As a result, the Java virtual machine can run Java application programs which are made up independently of the number of registers of an installed host processor.

Java programming language has a defective having a slow execution speed in comparison with a code that is made with language such as C or C++. However, to overcome this defective, Java programming language employs a software interpretation method, a JIT (Just-In-Time) compilation method, an AOT (Ahead-Of-Time) compilation method, or a hardware implementation method.

The software interpretation method is widely used in the case that restriction of resources is serious. However, because analysis of bytecodes is achieved in software, an execution speed of the analysis of bytecodes is slow. Further, the JIT complication method and the AOT complication method have shortcomings requiring a large capacity of memory, respectively.

The hardware implementation method achieves analysis of bytecodes in hardware unlike other methods, to thereby heighten the execution speed thereof. In addition, since the hardware implementation method does not need a large capacity of memory, it is suitable for an embedded system.

A software interpreter and a hardware interpreter are called commonly as a Java interpreter, respectively. The Java interpreter has native codes as codes that a Java virtual machine should execute for each bytecode. The Java interpreter executes bytecodes sequentially. If one bytecode is fetched, the Java interpreter decodes the fetched bytecode. Accordingly, the Java interpreter executes the bytecode with one or more native codes which perform the same operation as that of a corresponding bytecode. Here, since the hardware interpreter has a code to be executed in a memory beforehand, and then maps position of the code in hardware, the execution speed of the hardware interpreter is faster than that of the software interpreter where the mapping process is performed in software.

The bytecode is classified into an operation code (opcode) that prescribes an execution operation, and an operand which is dependent upon the operation code (opcode) and is used when a corresponding operation code (opcode) is executed. Since both the operation code (opcode) and the operand are made up of a single byte, respectively, the number of all possible operation codes (opcode) is totally 256. However, according to the Java virtual machine specification, the number of the operation codes (opcode) is prescribed into 202. The remaining operation codes (opcode) are prescribed so as to be defined and used as new bytecodes in the Java virtual machine. This may be defined by translating a corresponding operation code into a new operation code that is not defined in the Java virtual machine specification in the process of executing a particular bytecode. In addition, the operand may be translated into user's desired data.

If a Java application program is compiled, a class file is created in a manner that an operand is put at the back of each operation code and a subsequent operation code is put behind the operand. Here, each operation code may have several operands or may have no operand.

When Java application programs are executed, fields may be frequently accessed. In the case of bytecodes which are relevant with the field access, there are a static field access and an object field access. In each case, there are two kinds of bytecodes which perform writing and reading on and from a field. The bytecode for the static field access is defined as 'getstatic' and 'putstatic,' and the bytecode for the object field access is defined as 'getfield' and 'putfield.' These bytecodes for the static field access and the object field access have two operands, respectively.

Figure 1:
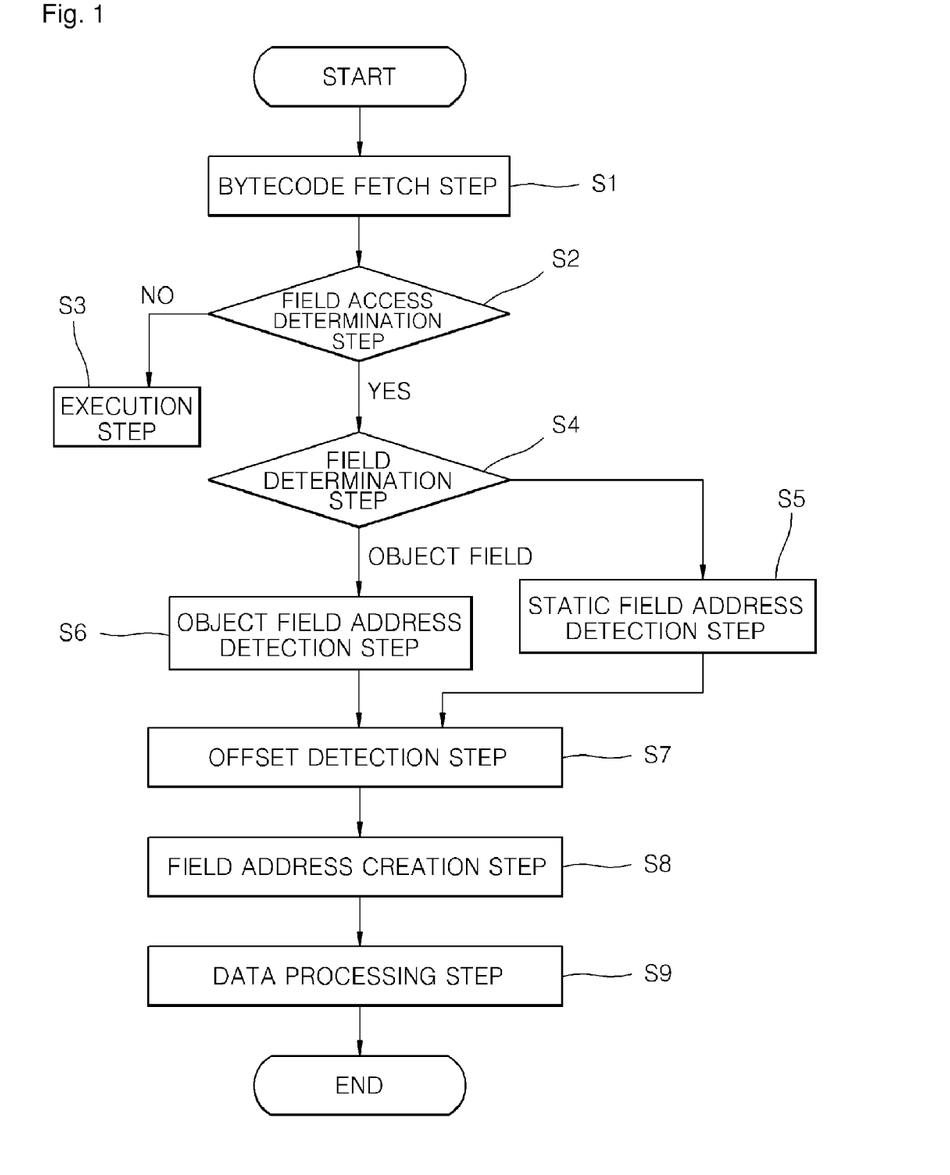
FIG. 1 is a flowchart view illustrating a process of a conventional field access bytecode.

FIG. 1 is a flowchart view illustrating a process of a conventional field access bytecode.

The process of processing the conventional field access bytecode as shown in FIG. 1, includes: a bytecode fetch step (S1); a field access determination step (S2); an execution step (S3); a field determination step (S4); a static field address detection step (S5); an object field address detection step (S6); an offset detection step (S7); a field address creation step (S8); and a data processing step (S9). The bytecode fetch step (S1) fetches bytecode from a class file. The field access determination step (S2) determines whether or not a bytecode that is fetched by an operation code of the bytecode that has been fetched from the bytecode fetch step (S1) is a bytecode for field access. If the bytecode that has been fetched in the field access determination step (S2) is not a bytecode for field access, the execution step (S3) jumps to a handler that corresponds to an operation code of a corresponding bytecode and executes the corresponding bytecode. If the bytecode that has been fetched in the field access determination step (S2) is a bytecode for field access, the field determination step (S4) determines whether or not the fetched bytecode is a bytecode for static field access that is getstatic or putstatic, or object field access that is getfield or putfield. If the bytecode that has been fetched in the field determination step (S4) is getstatic or putstatic, the static field address detection step (S5) extracts a static field address which is an initial address of the static field of a predetermined Java virtual machine. If the bytecode that has been fetched in the field determination step (S4) is getfield or putfield, the object field address detection step (S6) detects an object field address that is an initial address of an object field by object reference data stored in the top-level of a stack. The offset detection step (S7) analyzes a constant pool by an operand of the fetched bytecode and detects a field offset of an object to be accessed. The field address creation step (S8) adds the field offset detected in the offset detection step (S7) and the object field address or the static field address. The data processing step (S9) gains access to a field by the field address created in the field address creation step (S8), and processes data.

The data processing step (S9) stores data stored in the field of the corresponding field address in the top-level of a stack, if the fetched bytecode is getstatic or getfield. If the fetched bytecode is putstatic or putfield, the data processing step (S9)

stores data stored just below the top-level of the stack in a field of a corresponding field address.

As illustrated in FIG. 1, in the case that the fetched bytecode is a bytecode relating to the field access, the offset detection step (S7) should analyze a constant pool necessarily and detect the field offset of an object to be accessed. In this case, since several thousands of native codes are usually required only in the case of a process of analyzing the constant pool, degradation occurs when executing Java application programs.

Figure 2:
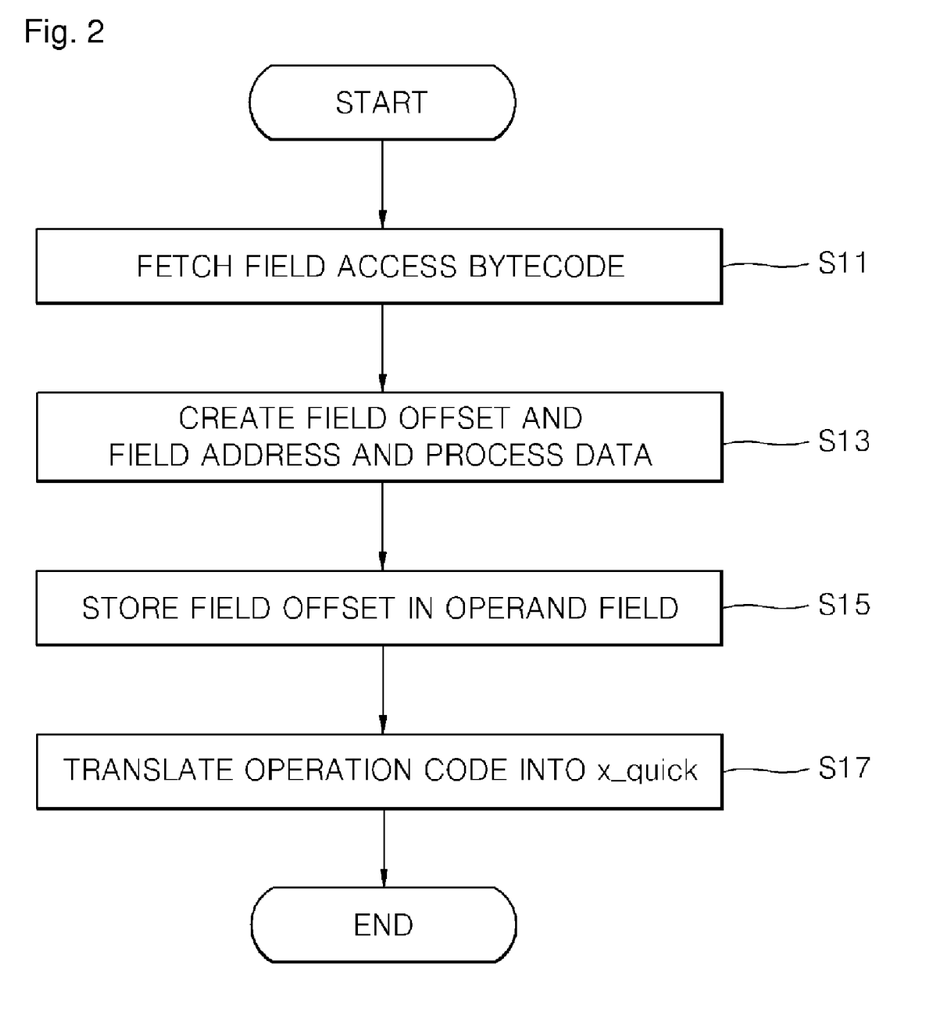
FIGS. 2 and 3 are flowchart views showing a conventional Java bytecode translating method for field access.
Figure 3:
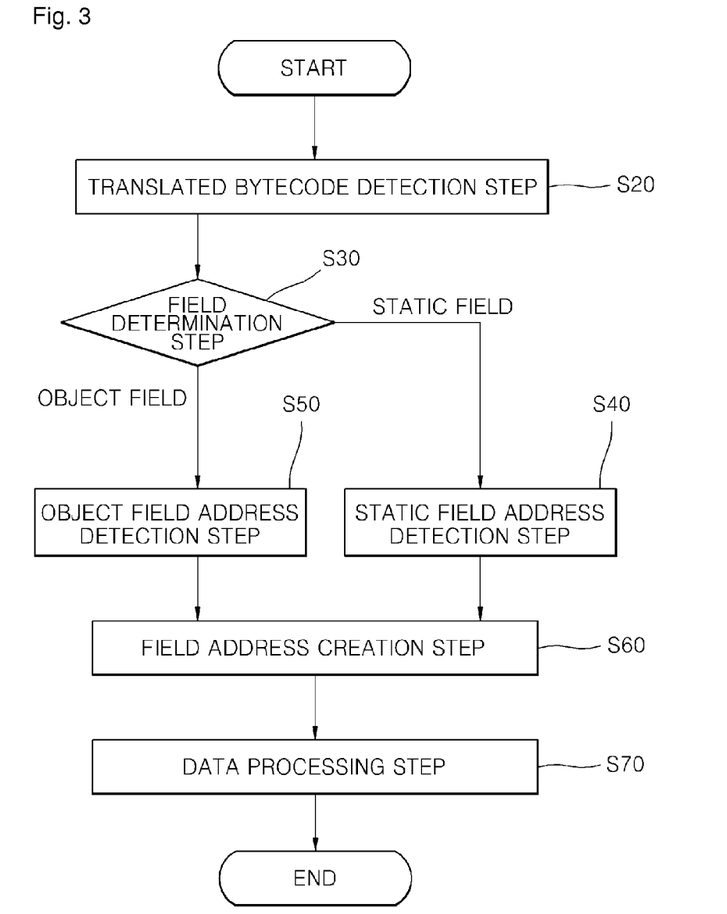
Figure 4:
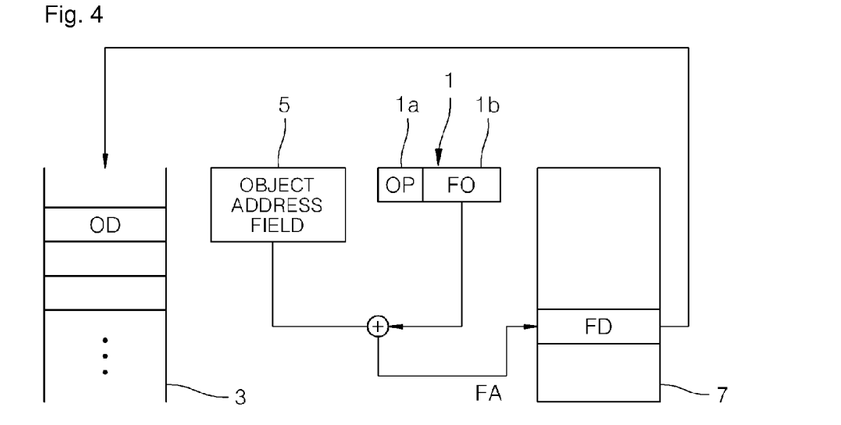
FIG. 4 is a block diagram for explaining the conventional Java bytecode translating method of FIGS. 2 and 3.

FIGS. 2 and 3 are flowchart views showing a conventional Java bytecode translating method that has been improved to prevent degradation at the time of executing Java application programs of FIG. 1, and FIG. 4 is a block diagram for explaining the getfield of an object field access in the conventional Java bytecode translating method of FIGS. 2 and 3.

The conventional Java bytecode translating method shown in FIGS. 2 to 4 has been proposed by SUN Microsystem company in order to reduce the number of native code in the case of the field access bytecode. Here, if the fetched bytecode is a bytecode for field access, the fetched bytecode is translated into a new bytecode and is processed as a bytecode for field access. For example, the new bytecode is 'x_quick' in which 'x' is one of getstatic, putstatic, getfield and putfield.

That is, as illustrated in FIG. 2, if a bytecode that is fetched in a specific program counter is a bytecode for field access (S11), a constant pool corresponding an operand of the bytecode is analyzed from the operand of the bytecode, in the same manner as that of the bytecode processing procedure for field access as illustrated in FIG. 1, and a field offset (FO) is detected by analysis of the constant pool, to thus process a field address (FA) and data (S13). Then, the field offset (FO) is stored at a position of the operand 1b of the bytecode (S15), and an operation code (OP) of the bytecode is translated into 'x_quick' which is a new bytecode (S17). Here, as described above, 'x' is one of getstatic, putstatic, getfield and putfield. Thereafter, the translated operation code is recognized as 'x_quick' in the Java virtual machine.

As illustrated in FIGS. 3 and 4, the conventional Java bytecode translating method will follow.

The translated bytecode detection step (S20) detects whether or not the operation code (OP) 1a of the fetched bytecode 1 is 'x_quick' which is the operation code (OP) 1a of the bytecode for newly translated field access. If the bytecode detected in the translated bytecode detection step (S20) is a bytecode for newly translated field access, the field determination step (S30) determines whether or not the fetched bytecode is a bytecode for static field access or object field access. The static field address detection step (S40) extracts a static field address of a predetermined Java virtual machine if the bytecode fetched in the field determination step (S30) is the static field access, that is, getstatic_quick or putstatic_quick. The object field address detection step (S50) detects an object field address 5 by an object reference data (OD) stored in the top-level of a stack 3 if the bytecode fetched in the field determination step (S30) is the object field access, that is, getfield_quick or putfield_quick. The field address creation step (S60) adds the field offset (FO) that has been stored in the operand 1b of the fetched bytecode and the object field address or the static field address and creates a field address (FA). The data processing step (S70) gains access to a field 7 of the created field address (FA) and processes field data (FD).

The conventional Java bytecode translating method shown in FIGS. 2 to 4 does not need to perform an analysis of the constant pool for detecting the field offset in the case of the bytecode which has been translated into the new bytecode at the time of executing the bytecode for field access. Accordingly, the conventional Java bytecode translating method has an advantage of remarkably reducing the number of native codes. However, in the case of the bytecode for object field access, the conventional Java bytecode translating method has shortcomings that it should detect an object field address from object reference data located in the top-level of the stack, and should add the field offset (FO) that has been stored in the operand of the newly translated bytecode and the object field address or should add the field offset (FO) and the static field address, in order to create a field address. To perform these processes, a number of native codes are needed. For this reason, the conventional Java bytecode translating method has a problem that degradation still occurs at the time of execution of Java application programs.

DISCLOSURE OF INVENTION

Technical Problem

Therefore, to solve the above problems, it is an object of the present invention to provide a Java bytecode translating method which includes the steps of: storing a field address created with respect to a bytecode for static field access and object field access separately in an operand of a bytecode and a storage portion; then translating an operation code of a corresponding bytecode into a predetermined operation code; gaining access to a field by the field address by data stored in the operand and the storage portion if the bytecode for field access corresponding to the predetermined operation code is fetched, to thus process data and quickly create the field address for static field access and object field access; and reducing the number of native codes that are required at the time of creating the field address.

Technical Solution

To accomplish the above objects of the present invention, according to an aspect of the present invention, there is provided a Java bytecode translating method comprising:

a bytecode fetch step (S110) that fetches a Java bytecode from a Java class file, in which the Java bytecode comprises an operation code field where an operation code is stored and an operand field where an operand is stored;

a static field address detection and data processing step (S140) which analyzes a constant pool by an operand of the fetched bytecode and adds a field offset of an object to be accessed and a static field address having a predetermined value, in the case that an operation code of the Java bytecode that has been fetched at the bytecode fetch step is a static field access bytecode to gain access to a static field, to thus detect a first field address and gains access to a field according to the first field address to thus process data;

a static field address storage step (S150) that stores a first upper field address including upper bits among bits of the first field address detected in the static field address detection and data processing step (S140) in a first storage portion, and which stores a first lower field address including remainder lower bits excluding the first upper field address among the bits of the first field address in the operand field;

a static operation code translating step (S160) that translates an operation code stored in the operation code field into user's predetermined new static field access operation code;

a first field address creation step (S240) that creates a second field address in which the first upper field address stored in the first storage portion and the first lower field address stored in the operand field of the fetched Java bytecode are concatenated to create a second field address, if the Java bytecode fetched in the bytecode fetch step is the Java bytecode having the operation code translated in the static operation code translating step; and a first data processing step (S250) that gains access to the field according to the second field address and processes data.

There is also provided a Java bytecode translating method comprising:

a bytecode fetch step (S310) that fetches a Java bytecode from a Java class file, in which the Java bytecode comprises an operation code field where an operation code is stored and an operand field where an operand is stored;

an object field address detection and data processing step (S340) which analyzes a constant pool by an operand of the fetched bytecode and adds a field offset of an object to be accessed and an object field address by first object reference data stored in the top-level of a stack, in the case that an operation code of the Java bytecode that has been fetched at the bytecode fetch step (S310) is an object field access bytecode to gain access to an object field, to thus detect a third field address and gains access to a field according to the third field address to thus process data;

a field offset and object reference data storage step (S350) that stores the first object reference data and the field offset in a second storage portion;

a second field address storage step (S360) which stores a second upper field address including upper bits among bits of the third field address detected in the object field address detection and data processing step (S340) in a third storage portion, and which stores a second lower field address including remainder lower bits excluding the second upper field address among the bits of the third field address in the operand field;

an object operation code translating step (S390) that translates an operation code stored in the operation code field into user's predetermined new object field access operation code;

a comparison step (S440) which compares whether or not the first object reference data stored in the second storage portion is identical to current object reference data stored in the top-level of the stack, if the Java bytecode that has been fetched at the bytecode fetch step (S310) is a Java bytecode having an operation code which has been translated at the object operation code translating step (S390);

a second field address creation step (S450) that concatenates the second upper field address stored in the third storage portion and the second lower field address stored in the operand field of the fetched Java bytecode, to create a fourth field address, if the first object reference data is identical to the current object reference data stored in the top-level of the stack, at the comparison step (S440);

a second data processing step (S460) that gains access to the field according to the fourth field address and processes data;

a third field address creation step (S470) that detects an object field address from the current object reference data stored in the top-level of the stack, and adds the detected object field address and the field offset stored in the second storage portion, to create a fifth field address, if the first object reference data is not identical to the current object reference data stored in the top-level of the stack, at the comparison step (S440); and a third data processing step (S480) that gains access to the field according to the fifth field address and processes data.

Advantageous Effects

As described above, the present invention can provide a Java bytecode translating method which includes the steps of: storing a field address created with respect to a bytecode for field access and object field access separately in an operand of a bytecode and a storage portion; then translating an operation code of a corresponding bytecode into a predetermined operation code; gaining access to a field by the field address by data stored in the operand and the storage portion if the bytecode for field access corresponding to the predetermined operation code is fetched, to thus process data and quickly create the field address for static field access and object field access; and reducing the number of native codes that are required at the time of creating the field address.

BRIEF DESCRIPTION OF THE DRAWINGS

The above and/or other objects and/or advantages of the present invention will become more apparent by describing the preferred embodiments thereof in detail with reference to the accompanying drawings in which.

BEST MODE FOR CARRYING OUT THE INVENTION

Hereinbelow, a Java bytecode translating method according to a preferred embodiment of the present invention will be described with reference to the accompanying drawings. Like reference numerals denote like elements through the following embodiments.

Figure 5:
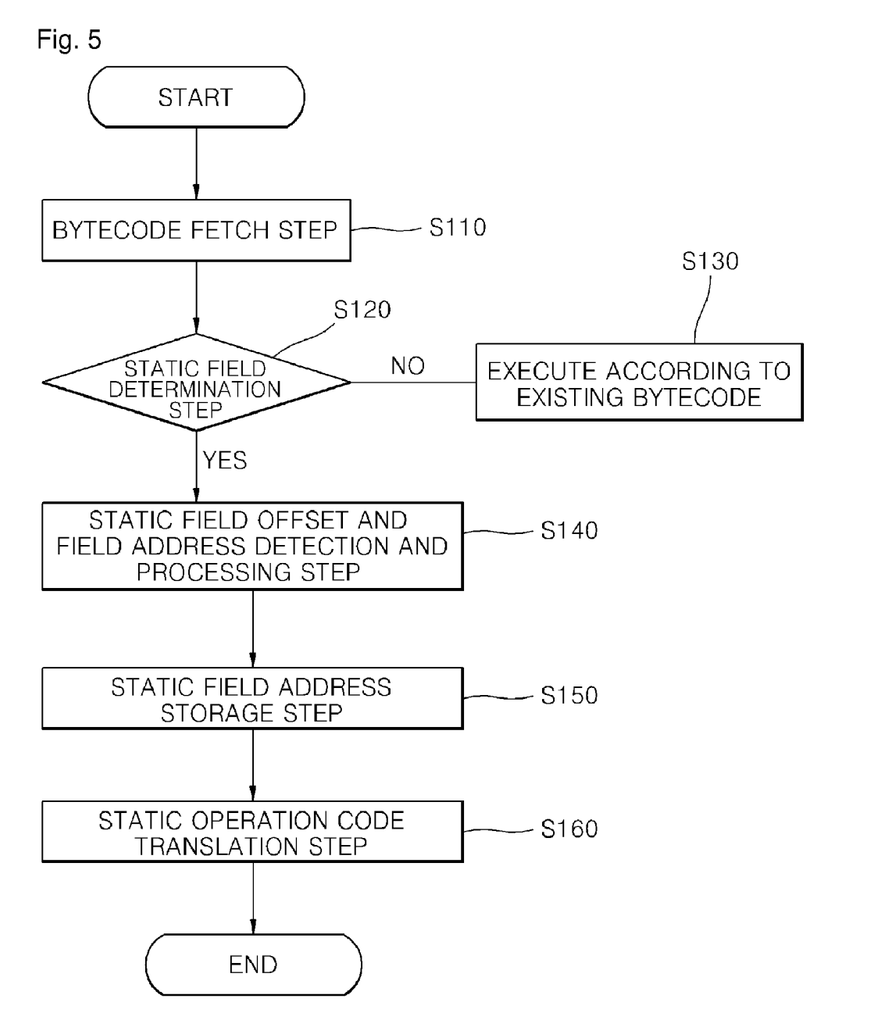
FIGS. 5 and 6 are flowchart views showing a Java bytecode translating method for static field access according to the present invention, respectively.
Figure 6:
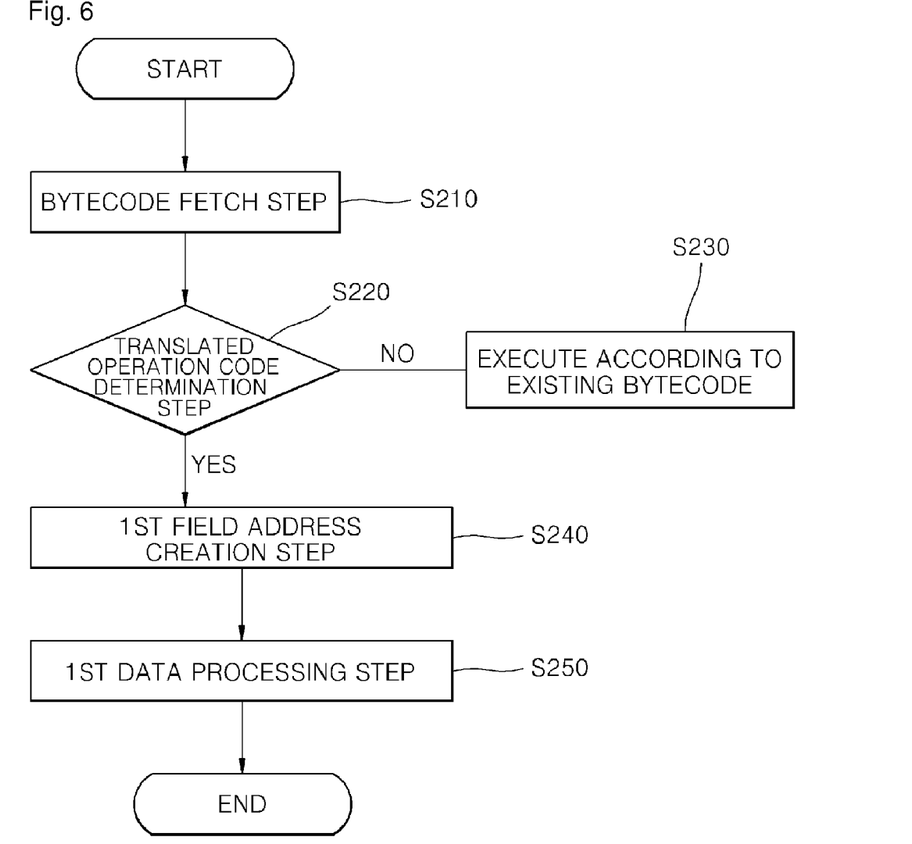
Figure 7:
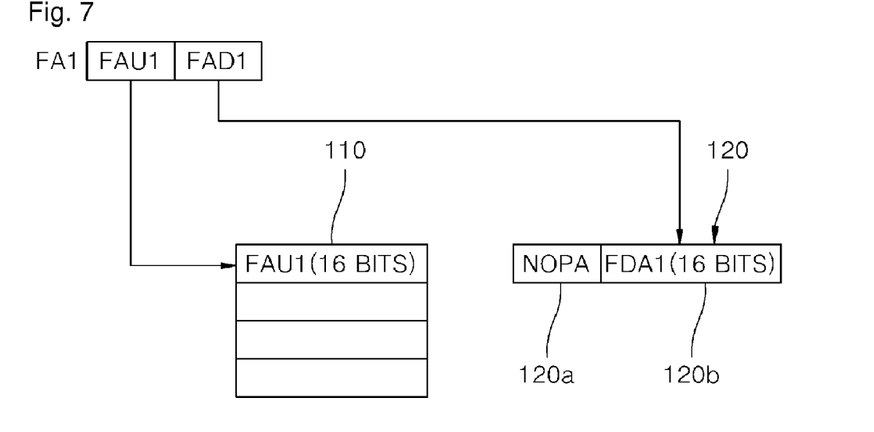
FIGS. 7 and 8 are block diagrams for explaining the Java bytecode translating method for static field access according to the present invention, respectively.
Figure 8:
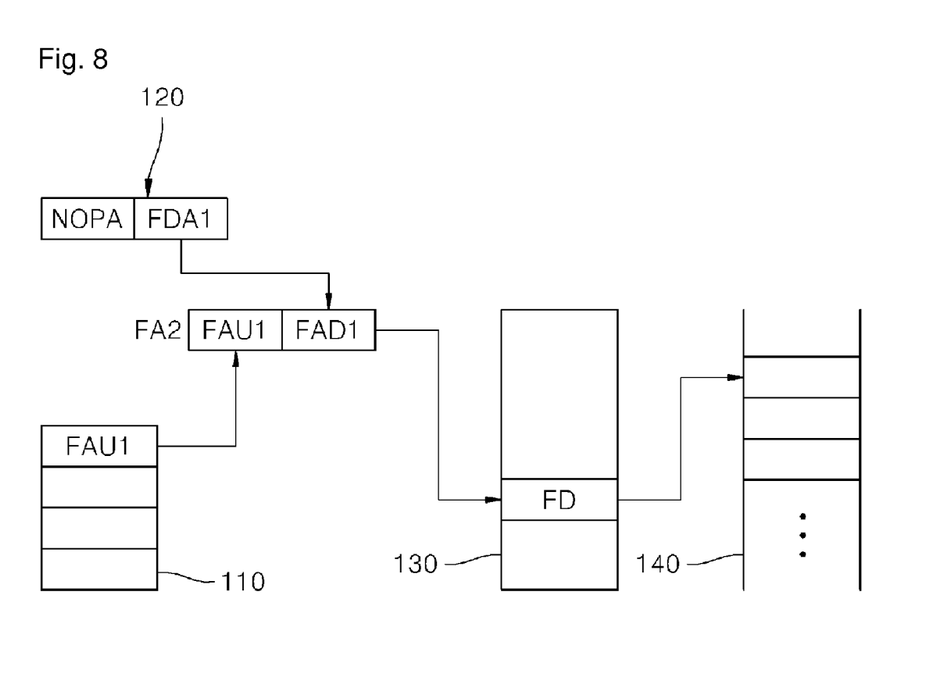

FIGS. 5 and 6 are flowchart views showing a Java bytecode translating method for static field access according to the present invention, respectively, and FIGS. 7 and 8 are block diagrams for explaining the Java bytecode translating method for static field access according to the present invention, respectively.

As illustrated in FIGS. 5 to 8, the Java bytecode translating method according to an exemplary embodiment of the present invention, includes a bytecode fetch step (S110), a static field address detection and data processing step (S140), a static field address storage step (S150), a static operation code translating step (S160), a first field address creation step (S240), and a first data processing step (S250).

The bytecode fetch step (S110) fetches a Java bytecode from a Java class file, in which the Java bytecode includes an operation code field where an operation code is stored and an operand field where an operand is stored.

The static field address detection and data processing step (S140) analyzes a constant pool by an operand of the fetched bytecode and adds a field offset of an object to be accessed and a static field address having a predetermined value, in the case that an operation code of the Java bytecode that has been fetched at the bytecode fetch step (S110) is a static field access bytecode to gain access to a static field, to thus detect a first field address (FA1) and gains access to a field 130 according to the first field address (FA1) to thus process data.

The static field address storage step (S150) stores a first upper field address (FAU1) including upper bits among bits of the first field address (FA1) detected in the static field address detection and data processing step (S140) in a first storage portion 110, and stores a first lower field address (FAD1) including remainder lower bits excluding the first upper field address (FAU1) among the bits of the first field address (FA1) in the operand field 120b.

The static operation code translating step (S160) translates an operation code stored in the operation code field 120a into user's predetermined new static field access operation code (NOPA).

The first field address creation step (S240) concatenates the first upper field address (FAU1) stored in the first storage portion 110 and the first lower field address (FAD1) stored in the operand field 120b of the fetched Java bytecode, to create a second field address (FA2), if the Java bytecode fetched in the bytecode fetch step (S110) is the Java bytecode having the operation code (NOPA) translated in the static operation code translating step (S160).

The first data processing step (S250) gains access to the field 130 according to the second field address (FA2) and processes data.

In the case that the first field address (FA1) is 32 bits, the first upper field address (FAU1) is data including upper 16 bits, and the first lower field address (FAD1) is data including lower 16 bits.

The first storage portion 110 is implemented into any one of a temporary storage memory such as a volatile memory, a permanent storage memory such as a nonvolatile memory and a register.

Figure 9:
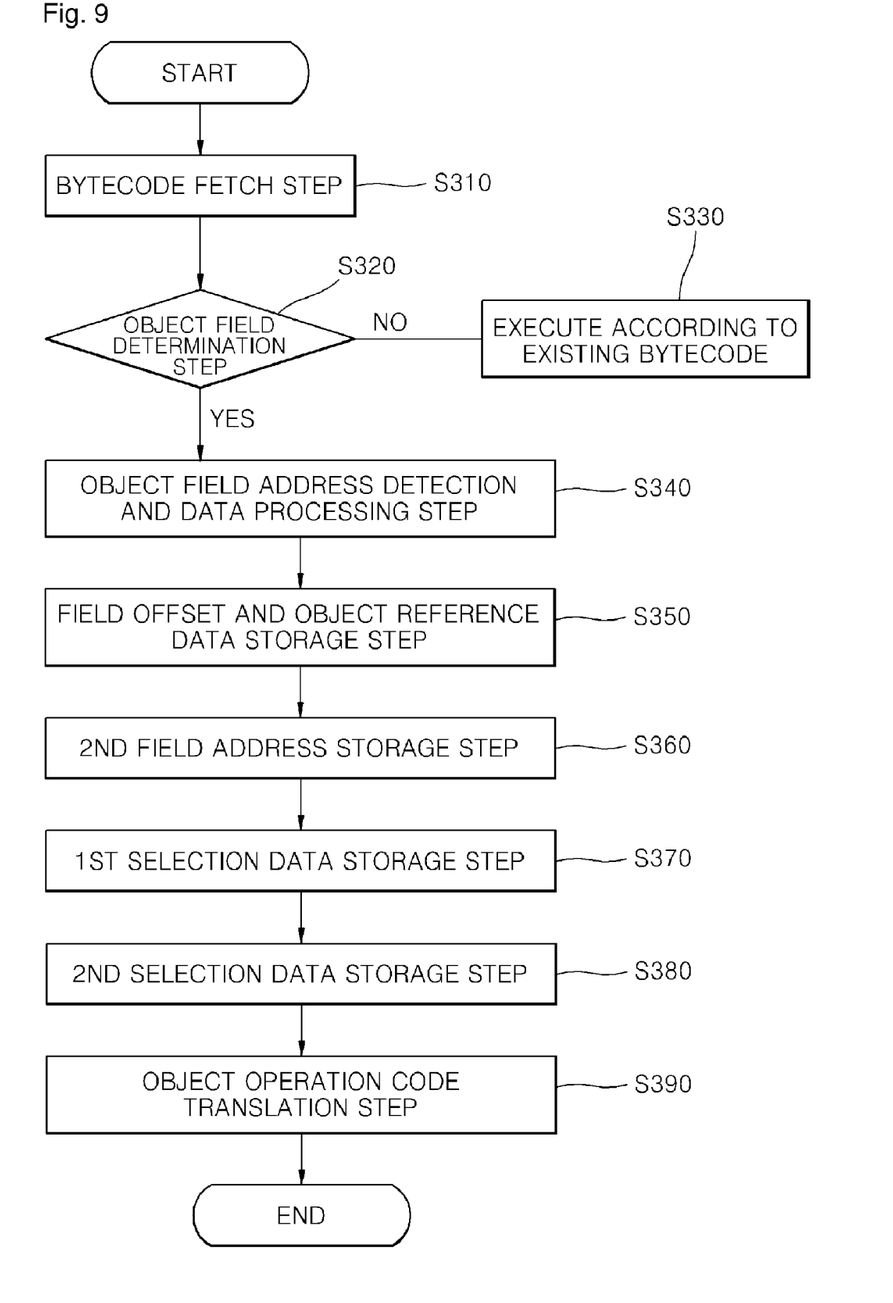
FIGS. 9 and 10 are flowchart views showing a Java bytecode translating method for object field access according to the present invention, respectively.
Figure 10:
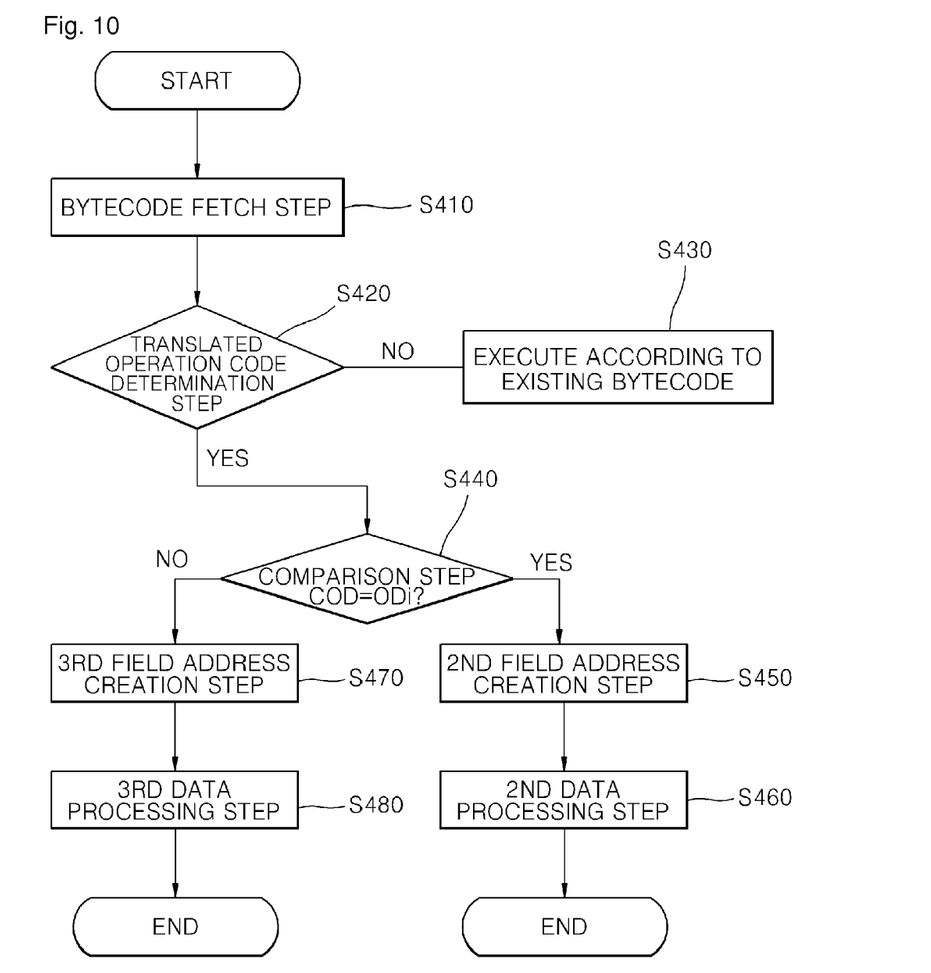
Figure 11:
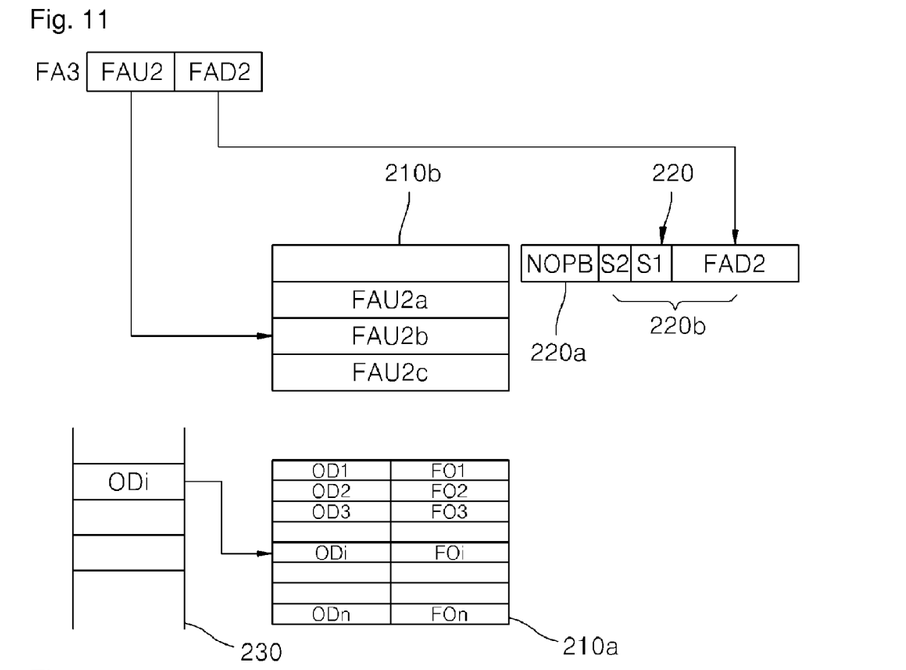
FIGS. 11 and 12 are block diagrams for explaining the Java bytecode translating method for object field access according to the present invention, respectively.
Figure 12:
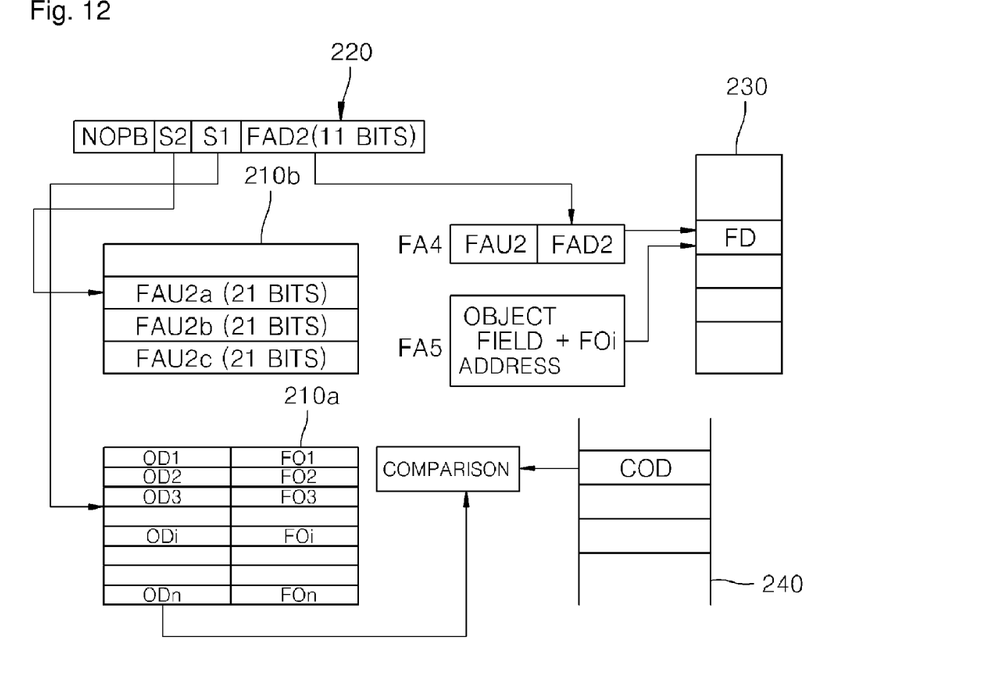

FIGS. 9 and 10 are flowchart views showing a Java bytecode translating method for object field access according to the present invention, respectively, and FIGS. 11 and 12 are block diagrams for explaining the Java bytecode translating method for object field access according to the present invention, respectively.

As illustrated in FIGS. 9 to 12, the Java bytecode translating method of this invention includes a bytecode fetch step (S310), an object field address detection and data processing step (S340), a field offset and object reference data storage step (S350), a second field address storage step (S360), an object operation code translating step (S390), a comparison step (S440), a second field address creation step (S450), a second data processing step (S460), a third field address creation step (S470), and a third data processing step (S480).

The bytecode fetch step (S310) fetches a Java bytecode from a Java class file, in which the Java bytecode includes an operation code field where an operation code is stored and an operand field where an operand is stored.

The object field address detection and data processing step (S340) analyzes a constant pool by an operand of the fetched bytecode and adds a field offset (FOi) of an object to be accessed and an object field address by first object reference data (ODi) stored in the top-level of a stack 240, in the case that an operation code of the Java bytecode that has been fetched at the bytecode fetch step (S310) is an object field access bytecode to gain access to an object field, to thus detect a third field address (FA3) and gains access to a field 230 according to the third field address (FA3) to thus process data.

The field offset and object reference data storage step (S350) stores the first object reference data (ODi) and the field offset (FOi) in a second storage portion 210a.

The second field address storage step (S360) stores a second upper field address (FAU2) including upper bits among bits of the third field address (FA3) detected in the object field address detection and data processing step (S340) in a third storage portion 210b, and which stores a second lower field address (FAD2) including remainder lower bits excluding the second upper field address (FAU2) among the bits of the third field address (FA3) in the operand field 220b.

The object operation code translating step (S390) translates an operation code stored in the operation code field 220a into user's predetermined new object field access operation code (NOPB).

The comparison step (S440) compares whether or not the first object reference data (ODi) stored in the second storage portion 210a is identical to current object reference data (COD) stored in the top-level of the stack 240, if the Java bytecode that has been fetched at the bytecode fetch step (S310) is a Java bytecode having an operation code (NOPB) which has been translated at the object operation code translating step (S390).

The second field address creation step (S450) concatenates the second upper field address (FAU2) stored in the third storage portion 210b and the second lower field address (FAD2) stored in the operand field 220b of the fetched Java bytecode, to create a fourth field address (FA4), if the first object reference data (ODi) is identical to the current object reference data (COD) stored in the top-level of the stack 240, at the comparison step (S440).

The second data processing step (S460) gains access to the field 230 according to the fourth field address (FA4) and processes data.

The third field address creation step (S470) detects an object field address from the current object reference data (COD) stored in the top-level of the stack 240, and adds the detected object field address and the field offset (FOi) stored in the second storage portion 210a, to create a fifth field address (FA5), if the first object reference data (ODi) is not identical to the current object reference data (COD) stored in the top-level of the stack 240, at the comparison step (S440).

The third data processing step (S480) gains access to the field 230 according to the fifth field address (FA5) and processes data.

The Java bytecode translating method according to the exemplary embodiment of the present invention shown in FIGS. 9 to 12, further includes a first selection data storage step (S370) that stores the first object reference data (ODi) and the field offset (FOi) at a specific position of the second storage portion 210a, and stores the first object reference data (ODi) stored at the specific position of the second storage portion 210a and the first selection data (S1) for selecting the field offset (FOi) in the operand field 220b.

The Java bytecode translating method according to the exemplary embodiment of the present invention shown in FIGS. 9 to 12, further also includes a second selection data storage step (S380) that stores the second upper field address (FAU2) at a specific position of the third storage portion 210b, and stores the second selection data (S2) for selecting the second upper field address (FAU2) stored at the specific position of the third storage portion 210b in the operand field 220b.

In the case that the third field address (FA3) is 32 bits, the second upper field address (FAU2) may be data including upper 16 bits, and the second lower field address (FAD2) may be data including lower 16 bits.

Otherwise, in the case that the third field address (FA3) is 32 bits, the second upper field address (FAU2) may be data including upper 21 bits, the second lower field address (FAD2) may be data including lower 11 bits, the first selection data (S1) may be data including 3 bits, and the second selection data (S2) may be data including 2 bits.

The second and third storage portions 210a and 210b may be implemented into one of a temporary storage memory such as a volatile memory, a permanent storage memory such as a nonvolatile memory and a register, respectively.

The operation of the Java bytecode translating method having the above-described structure will follow.

There are two types of Java bytecodes which are related to Java field access, in which one is a bytecode for static field access and the other is a bytecode for object field access. There are 'getstatic' and 'putstatic' as the bytecode for static field access, and there are 'getfield' and 'putfield' as the bytecode for object field access.

FIGS. 5 to 8 illustrate a Java bytecode translating method for static field access according to the exemplary embodiment of the present invention. The Java bytecode translating method for static field access according to the exemplary embodiment of the present invention will follow.

As illustrated in FIGS. 5 to 8, the Java bytecode translating method for static field access according to the exemplary embodiment of the present invention includes a bytecode fetch step (S110), a static field address detection and data processing step (S140), a static field address storage step (S150), a static operation code translating step (S160), a first field address creation step (S240), and a first data processing step (S250).

At the bytecode fetch step (S110), a Java bytecode is fetched from a Java class file, in which the Java bytecode includes an operation code field where an operation code is stored and an operand field where an operand is stored.

At the static field address detection and data processing step (S140), a constant pool is analyzed by an operand of the fetched bytecode in the same manner as that of the conventional art and a field offset of an object to be accessed and a static field address having a predetermined value are added, to thus detect a first field address (FA1) in the case that an operation code of the Java bytecode that has been fetched at the bytecode fetch step (S110) is a static field access bytecode to gain access to a static field, that is, the operation code is getstatic' and 'putstatic.' If a bytecode for static field access is identical to a program counter to be fetched, a field address for static field access to be created always has an identical value. A field 130 is gained access to according to the created first field address (FA1), and thus the field data (FD) stored in the field 130 corresponding to the first field address (FA1) is stored in the top-level of the stack 140, according to the operation code of 'getstatic' or 'putstatic,' or the data that is stored below the top-level of the stack 140 is stored in the field 130 of the address corresponding to the first field address (FA1).

At the static field address storage step (S150), a first upper field address (FAU1) including upper bits among bits of the first field address (FA1) is stored in the first storage portion 110 which is implemented into any one of a temporary storage memory such as a volatile memory, a permanent storage memory such as a nonvolatile memory and a register, and a first lower field address (FAD1) including remainder lower bits excluding the first upper field address (FAU1) among the bits of the first field address (FA1) is stored in the operand field 120b. In other words, since the last field address for static field access is 32 bits, the 32-bit last field address for static field access cannot be stored in the 16-bit operand field. Thus, the first upper field address (FAU1) including the upper 16 bits of the first field address (FA1) is stored in the first storage portion 110, and the first lower field address (FAD1) including the lower 16 bits of the first field address (FA1) is stored in the operand field 120b of the fetched bytecode 120.

At the static operation code translating step (S160), an operation code of 'getstatic' or 'putstatic' stored in the operation code field 120a is translated into 'getstatic_new' or 'putstatic_new' which is a user's predetermined new static field access operation code (NOPA).

At the first field address creation step (S240), the first upper field address (FAU1) stored in the first storage portion 110 and the first lower field address (FAD1) stored in the operand field 120b of the fetched Java bytecode are concatenated, to create a second field address (FA2), if the Java bytecode fetched in the bytecode fetch step (S110) is the Java bytecode having the operation code (NOPA) translated in the static operation code translating step (S160).

At the first data processing step (S250), the field 130 is gained access to according to the second field address (FA2) and data is processed.

Therefore, if the bytecode for static field access according to the exemplary of the present invention is initially fetched in the bytecode fetch step S110, the first field address (FA1) is created through the constant pool analysis in the same manner as the conventional method, and data is processed. Then, the first field address (FA1) is separately stored in the first storage portion 110 and the operand field 120b of the fetched bytecode, and the operation code field is translated into the new operation code. Thereafter, if the bytecode which has been translated into the new operation code in the bytecode fetch step (S110) is fetched, the first upper field address (FAU1) stored in the first storage portion 110 and the first lower field address (FAD1) which is the operand in the operand field 120b of the fetched Java bytecode are concatenated, to create the second field address (FA2), and the field 130 is gained access to according to the created second field address (FA2) and data is processed. Accordingly, unlike the conventional art, a field address can be created quickly. In other words, as illustrated in FIGS. 2 and 3, in the case of the conventional art, the created field offset and the detected static field address are added, to thus create the final field address. However, in the case of the exemplary embodiment of the present invention, since the created field address for the static field access is identical if the program counter from which the bytecode is fetched is identical, the upper 16 bits of the first field address (FA1) which is an identical field address are stored in the first storage portion 110, and the lower 16 bits thereof are stored in the operand field 120b. When there is a need, the upper 16 bits and the lower 16 bits are concatenated, the second field address (FA2) being the final field address can be quickly created.

In the case that a hardware interpreter manages to update the program counter, the field data (FD) stored in the field 130 is read from the second field address (FA2) to execute a bytecode command of 'getstatic_new' that is illustrated in FIG. 8, and the field data (FD) is stored in the top-level of the stack 140. In addition, three native codes which update a stack pointer are needed. If the hardware interpreter manages to update even the stack pointer, two native codes are needed. As a result, in comparison with the conventional art, the number of native codes that are required for execution of the bytecode command can be reduced, to thus improve performance of the Java application program.

FIGS. 9 to 12 illustrate a Java bytecode translating method for object field access according to the exemplary embodiment of the present invention. The Java bytecode translating method for object field access according to the exemplary embodiment of the present invention will follow.

Although the fetched program counter equals, the object reference data that exists in the top-level of the stack 240 may differ. Accordingly, the bytecode for object field access, that is, 'getfield' and 'putfield' should be differently processed from the bytecode for static field access.

As illustrated in FIGS. 9 to 12, the Java bytecode translating method for object field access according to the exemplary embodiment of the present invention includes a bytecode fetch step (S310), an object field address detection and data processing step (S340), a field offset and object reference data storage step (S350), a second field address storage step (S360), a first selection data storage step (S370), a second selection data storage step (S380), an object operation code translating step (S390), a comparison step (S440), a second field address creation step (S450), a second data processing step (S460), a third field address creation step (S470), and a third data processing step (S480).

At the bytecode fetch step (S310), a Java bytecode is fetched from a Java class file, in which the Java bytecode includes an operation code field where an operation code is stored and an operand field where an operand is stored.

At the object field address detection and data processing step (S340), a constant pool is analyzed by an operand of the fetched bytecode in the same manner as that of the conventional art, and a field offset (FOi) of an object to be accessed and an object field address by first object reference data (ODi) stored in the top-level of a stack 240 are added, in the case that an operation code of the Java bytecode that has been fetched at the bytecode fetch step (S310) is an object field access bytecode to gain access to an object field, that is, 'getfield' or 'putfield' to thus detect a third field address (FA3) and gains access to a field 230 according to the third field address (FA3) to thus process data.

At the field offset and object reference data storage step (S350), the first object reference data (ODi) and the field offset (FOi) are stored in a second storage portion 210*a*.

At the second field address storage step (S360), a second upper field address (FAU2) including upper bits among bits of the third field address (FA3) detected in the object field address detection and data processing step (S340) are stored in a third storage portion 210*b*, and a second lower field address (FAD2) including remainder lower bits excluding the second upper field address (FAU2) among the bits of the third field address (FA3) are stored in the operand field 220*b*.

In the case that the third field address (FA3) is 32 bits, the second upper field address (FAU2) may be data including upper 16 bits, and the second lower field address (FAD2) may be data including lower 16 bits, in the same manner as that of the case of the static field access. Otherwise, the sizes of the bits of the second upper field addresses (FAU2) and the second lower field address (FAD2) are differ according to the first object reference data (ODi) and the field offset (FOi) and the number of the second upper field addresses (FAU2), which are stored in the second storage portion 210*a* and the third storage portion 210*b*, respectively. For example, the number of entries that can be stored in the second storage portion 210*a* is established as eight and the number of entries that can be stored in the third storage portion 210*b* is established as four, as illustrated in FIG. 9. Of course, the number of entries is a value determined by a user. The number of the field offsets (FOi) and the number of the first object reference data (ODi) which are stored in the second storage portion 210*a* can be eight in numbers, respectively. The first selection data (S1) including 3 bits is needed to determine an entry of the stored position. In the case that the number of the second upper field addresses (FAU2) stored in the third storage portion 210*b* is three, the second selection data (S2) including 2 bits is needed to determine an entry of the stored position. In this case, since the first selection data (S1) and the second selection data (S2) should be stored in the operand field 120*b*, only 11 bits excluding the first selection data (S1) and the second selection data (S2) which are 5 bits should be stored in the operand field 120*b*. Accordingly, the second lower field address (FAD2) may be data including only lower 11 bits of the third field address (FA3), and the second upper field addresses (FAU2) may be data including the upper 21 bits.

At the first selection data storage step (S370), the first object reference data (ODi) and the field offset (FOi) are stored at a specific position of the second storage portion 210*a*, and the first selection data (S1) for selecting the first object reference data (ODi) and the field offset (FOi) are stored at the specific position of the second storage portion 210*a* is stored in the operand field 220*b*.

At the second selection data storage step (S380), the second upper field address (FAU2) is stored at a specific position of the third storage portion 210*b*, and the second selection data (S2) for selecting the second upper field address (FAU2) stored at the specific position of the third storage portion 210*b* in the operand field 220*b*.

At the object operation code translating step (S390), the 'getfield' or 'putfield' that is an operation code stored in the operation code field 220*a* is translated into the 'getfield_new' or 'putfield_new' that is user's predetermined new object field access operation code (NOPB).

As shown in FIGS. 9 and 12, at the comparison step (S440), it is compared whether or not the first object reference data (ODi) stored in the second storage portion 210*a* is identical to current object reference data (COD) stored in the top-level of the stack 240, if the Java bytecode that has been fetched at the bytecode fetch step (S310) is a Java bytecode having an operation code (NOPB) which has been translated at the object operation code translating step (S390), in a translated operation code determination step (S420) of FIG. 10, that is, in the case that a program counter which is identical to a program counter having the operation code (NOPB) which has been translated at the object operation code translating step (S390) is fetched.

If the Java bytecode that has been fetched at the bytecode fetch step (S310) is not a Java bytecode having an operation code (NOPB) which has been translated at the object operation code translating step (S390), the same method as the conventional bytecode translation method is executed (S430).

If the first object reference data (ODi) stored in the second storage portion 210*a* is identical to current object reference data (COD) stored in the top-level of the stack 240, at the comparison step (S440), the last field address is identical to the third field address (FA3) detected in the object field address detection and data processing step (S340). Accordingly, at the second field address creation step (S450), the second upper field address (FAU2) including 21 bits stored in the third storage portion 210*b* and the second lower field address (FAD2) including 11 bits stored in the operand field 220*b* of the fetched Java bytecode are concatenated to thus create the fourth field address (FA4), and at the second data processing step (S460), the field 230 is accessed according to the fourth field address (FA4) to thus process data.

That is, at the comparison step (S440), the upper field address stored in the storage portion and the lower field address stored in the operand field are concatenated to thus create the last field address for field access, in the same manner as the Java bytecode translation method for static field access of FIG. 5, if the first object reference data (ODi) and the current object reference data (COD) equal.

If the first object reference data (ODi) stored in the second storage portion 210a is not identical to the current object reference data (COD) stored in the top-level of the stack 240, at the comparison step (S440), the third field address (FA3) detected in the object field address detection and data processing step (S340) is not identical to the last field address of the bytecode having the fetched translated operation code for object field access. Accordingly, at the third field address creation step (S470), an object field address is detected from the current object reference data (COD) stored in the top-level of the stack 240, and the detected object field address and the field offset (FOi) stored in the second storage portion 210a are added, to thus create a fifth field address (FA5).

At the third data processing step (S480), the field 230 is accessed according to the fifth field address (FA5) to thus process data.

In the case that the first object reference data (ODi) and the field offset (FDi) stored in the second storage portion 210a respectively at the comparison step (S440) and the third field address creation step (S470) are fetched from the second storage portion 210a, the fetched result is determined according to a logic value of data of the first selection data (S1) stored in the operand field 220b of the fetched bytecode. That is, if the logic value of the first selection data (S1) is 011, the first object reference data (ODi) and the field offset (FDi) stored in the fourth entry of the second storage portion 210a are fetched from the second storage portion 210a.

Likewise, the second upper field address (FAU2) of the third field address (FA3) stored in the third storage portion 210b in the second field address storage step (S360) is fetched from the third storage portion 210b, the second upper field address (FAU2) stored at a position of an entry which is determined according to a data logic value of the second selection data (S2) is fetched. For example, if the second selection data (S2) is 10, the second upper field address (FAU2) that is stored in the third entry of the third storage portion 210b is fetched to then be concatenated with the second lower field address (FAD2) that is stored in the operand field 220b and to thus create a fourth field address (FA4) which is the last field address.

The second and third storage portions 210a and 210b are implemented into one of a temporary storage memory such as a volatile memory, a permanent storage memory such as a nonvolatile memory and a register, respectively.

Therefore, the Java bytecode translating method for object field access according to the exemplary embodiment of the present invention illustrated in FIGS. 9 to 12, can concatenate the fetched second lower field address (FAD2) stored in the operand field with the second upper field address (FAU2) stored in the third storage portion 210b, to thereby create the fourth field address (FA4) that is the last field address for field access rapidly, and to thus reduce the number of native codes that are required hereupon, in the case that the current object reference data (COD) that exists in the top-level of the stack 240 is identical to the first object reference data (ODi) stored in the second storage portion 210a at the field offset and object reference data storage step (S350), at the time of processing the bytecode for object field access that has been fetched in the specific program counter. In the case that the current object reference data (COD) is not identical to the first object reference data (ODi), the field offset FDi stored in the second storage portion 210a is added to the object field address detected from the current object reference data (COD), to thus easily create the fifth field address (FA5) that is the last field address for field access.

The Java bytecode translating method according to this invention can be implemented into a Java bytecode translating method for static field access of FIGS. 5 and 6, and a Java bytecode translating method for object field access of FIGS. 9 and 10. For this purpose, after having fetched the bytecode at the bytecode fetch steps (S110, S210, S310, and S410), a field determination step is further required to determined whether the fetched bytecode is for object field access or for static field access, as shown in FIGS. 1 and 3. In addition, the first storage portion 110 and the second storage portion 210a may be implemented into a single storage portion without being separately implemented into two storage portions.

The conventional Java bytecode translating method shown in FIGS. 2 and 3 and the Java bytecode translating method according to this invention will be compared in which a hardware interpreter is incorporated in a base processor, and a Waba virtual machine which is made for a portable device as a target is used as an assistant software interpreter. In these cases, the numbers of native codes required are respectively compared, which will follow in the Table 1.

TABLE 1

| Bytecode | The Number of native codes required in the case of getstatic | The Number of native codes required in the case of putstatic | The Number of native codes required in the case of getfield | The Number of native codes required in the case of putfield |
| --- | --- | --- | --- | --- |
| Conventional art | 37 | 38 | 59 | 61 |
| Present invention | 3 | 3 | 23 | 26 |

In order to execute the bytecode of 'getfield' and 'putfield' for object field access in the Table 1, the second storage portion 210a should be accessed and it should be compared whether or not the first object reference data (ODi) is identical to the current object reference data (COD) of the top-level of stack 240. Accordingly, it can be seen that a more number of native codes have been required in comparison with the case that the bytecode of 'getstatic' and 'putstatic' for static field access is executed. In other words, it can be seen that the number of native codes required has been remarkably reduced in comparison with the conventional art at the time of execution of the bytecode by the Java bytecode translation method according to the present invention.

As a result, the Java bytecode translating method according to this invention can reduce the number of native codes required to create the field addresses for static field access and object field access. Accordingly, performance can be improved at the time of executing the Java application program.

Mode for the Invention

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

Industrial Applicability

As described above, the present invention can be applied to a Java bytecode translating method that can improve performance of a Java virtual machine, in which a field access bytecode is translated without having a progress of an analysis process of a constant pool when performing the field access bytecode among Java bytecodes, to thereby remarkably reduce the number of native codes.

The invention claimed is:

1. A Java bytecode translating method comprising:
a bytecode fetch step (S110) that fetches a Java bytecode from a Java class file, in which the Java bytecode comprises an operation code field where an operation code is stored and an operand field where an operand is stored;
a static field address detection and data processing step (S140) which analyzes a constant pool by an operand of the fetched bytecode and adds a field offset of an object to be accessed and a static field address having a predetermined value, in the case that an operation code of the Java bytecode that has been fetched at the bytecode fetch step (S110) is a static field access bytecode to gain access to a static field, to thus detect a first field address and gains access to a field according to the first field address to thus process data;
a static field address storage step (S150) that stores a first upper field address including upper bits among bits of the first field address detected in the static field address detection and data processing step (S140) in a first storage portion, and which stores a first lower field address including remainder lower bits excluding the first upper field address among the bits of the first field address in the operand field;
a static operation code translating step (S160) that translates an operation code stored in the operation code field into user's predetermined new static field access operation code;
a first field address creation step (S240) that concatenates the first upper field address stored in the first storage portion and the first lower field address stored in the operand field of the fetched Java bytecode, to create a second field address, if the Java bytecode fetched in the bytecode fetch step is the Java bytecode having the operation code translated in the static operation code translating step; and
a first data processing step (S250) that gains access to the field according to the second field address and processes data.

2. The Java bytecode translating method of claim 1, wherein the first upper field address is data including upper 16 bits, and the first lower field address is data including lower 16 bits, in the case that the first field address is 32 bits.

3. The Java bytecode translating method of claim 1, wherein the first storage portion is one of a temporary storage memory such as a volatile memory, a permanent storage memory such as a nonvolatile memory and a register.

4. A Java bytecode translating method comprising:
a bytecode fetch step (S310) that fetches a Java bytecode from a Java class file, in which the Java bytecode comprises an operation code field where an operation code is stored and an operand field where an operand is stored;
an object field address detection and data processing step (S340) which analyzes a constant pool by an operand of the fetched bytecode and adds a field offset of an object to be accessed and an object field address by first object reference data stored in the top-level of a stack, in the case that an operation code of the Java bytecode that has been fetched at the bytecode fetch step (S310) is an object field access bytecode to gain access to an object field, to thus detect a third field address and gains access to a field according to the third field address to thus process data;
a field offset and object reference data storage step (S350) that stores the first object reference data and the field offset in a second storage portion;
a second field address storage step (S360) which stores a second upper field address including upper bits among bits of the third field address detected in the object field address detection and data processing step (S340) in a third storage portion, and which stores a second lower field address including remainder lower bits excluding the second upper field address among the bits of the third field address in the operand field;
an object operation code translating step (S390) that translates an operation code stored in the operation code field into user's predetermined new object field access operation code;
a comparison step (S440) which compares whether or not the first object reference data stored in the second storage portion is identical to current object reference data stored in the top-level of the stack, if the Java bytecode that has been fetched at the bytecode fetch step (S310) is a Java bytecode having an operation code which has been translated at the object operation code translating step (S390);
a second field address creation step (S450) that concatenates the second upper field address stored in the third storage portion and the second lower field address stored in the operand field of the fetched Java bytecode, to create a fourth field address, if the first object reference data is identical to the current object reference data stored in the top-level of the stack, at the comparison step (S440);
a second data processing step (S460) that gains access to the field according to the fourth field address and processes data;
a third field address creation step (S470) that detects an object field address from the current object reference data stored in the top-level of the stack, and adds the detected object field address and the field offset stored in the second storage portion, to create a fifth field address, if the first object reference data is not identical to the current object reference data stored in the top-level of the stack, at the comparison step (S440); and
a third data processing step (S480) that gains access to the field according to the fifth field address and processes data.

5. The Java bytecode translating method of claim 4, further comprising a first selection data storage step (S370) that stores the first object reference data and the field offset at a specific position of the second storage portion, and stores the first object reference data stored at the specific position of the second storage portion and the first selection data for selecting the field offset in the operand field.

6. The Java bytecode translating method of claim 4, further comprising a second selection data storage step (S380) that stores the second upper field address at a specific position of the third storage portion, and stores the second selection data for selecting the second upper field address stored at the specific position of the third storage portion in the operand field.

7. The Java bytecode translating method of claim 4, wherein the second upper field address is data including upper 16 bits, and the second lower field address is data including lower 16 bits, in the case that the third field address is 32 bits.

8. The Java bytecode translating method of claim 6, wherein the second upper field address is data including upper 21 bits, the second lower field address is data including lower 11 bits, the first selection data is data including 3 bits, and the second selection data is data including 2 bits, in the case that the third field address is 32 bits.

9. The Java bytecode translating method of claim 4, wherein the second and third storage portions are one of a temporary storage memory such as a volatile memory, a permanent storage memory such as a nonvolatile memory and a register, respectively.

10. The Java bytecode translating method of claim 5, further comprising a second selection data storage step (S380) that stores the second upper field address at a specific position of the third storage portion, and stores the second selection data for selecting the second upper field address stored at the specific position of the third storage portion in the operand field.

* * * * *